(12) United States Patent
Semb

(10) Patent No.: US 6,681,710 B2
(45) Date of Patent: Jan. 27, 2004

(54) SYSTEM FOR CONTROLLING A MARINE SEISMIC ARRAY

(75) Inventor: Fredrik Ole Semb, Holmestrand (NO)

(73) Assignee: Petroleum Geo-Services AS, Lysaker (NO)

( * ) Notice: Subject to any disclaimer, the term of this patent is extended or adjusted under 35 U.S.C. 154(b) by 10 days.

(21) Appl. No.: 10/075,543

(22) Filed: Feb. 14, 2002

(65) Prior Publication Data

US 2002/0174817 A1 Nov. 28, 2002

(51) Int. Cl.[7] .............................................. B63B 21/66
(52) U.S. Cl. ....................... 114/244; 114/253
(58) Field of Search ................ 114/242, 247, 114/253

(56) References Cited

U.S. PATENT DOCUMENTS

| | | | | |
|---|---|---|---|---|
| 4,781,140 A | * | 11/1988 | Bell et al. | 114/244 |
| 4,798,156 A | * | 1/1989 | Langeland et al. | 114/242 |
| 4,809,005 A | | 2/1989 | Counselman, III | |
| 4,890,568 A | * | 1/1990 | Dolengowski | 114/246 |
| 4,958,331 A | | 9/1990 | Wardle | |
| 5,790,472 A | | 8/1998 | Workman et al. | |

FOREIGN PATENT DOCUMENTS

| | | |
|---|---|---|
| GB | 2047406 A | 11/1980 |
| GB | 2087556 A | 5/1982 |
| GB | 2184413 A | 1/1987 |

* cited by examiner

*Primary Examiner*—Jesus D. Sotelo
(74) *Attorney, Agent, or Firm*—E. Eugene Thigpen

(57) ABSTRACT

System for controlling seismic arrays comprising at least one deflector coupled to one side of the towing vessel through at least one wire, lead-in or similar, the detector being positioned at a distance perpendicular to the vessel's direction of movement, the vessel being provided with a navigation system for measuring the position of the vessel. The vessel comprises calculation means for, on the basis of the vessel's position, calculating deviations in vessel's position from a predetermined path. The wire is coupled to the vessel through control organs, e.g. a winch, adapted to vary the wire length from the vessel to the deflector. The control organs are coupled to the calculation means for adjusting the wire length based on the deviations in the position of the towing vessel, thus to avoid corresponding deviations in the movements of the deflector.

36 Claims, 2 Drawing Sheets

SYSTEM FOR CONTROLLING A MARINE SEISMIC ARRAY

This application claims priority to Norwegian patent application Serial No. 1999.3971, filed Aug. 17, 1999.

This invention relates to a system and a method for controlling a towed seismic array comprising at least one deflector on one side of a towing vessel coupled through at least one wire, lead-in or similar, the deflector being positioned with a distance perpendicular to the towing vessels direction of movement, the towing vessel being provided with a navigation system for measuring the position of the vessel.

In seismic surveys at sea a number of seismic cables are usually being towed after a vessel. The survey of the geological formations at the sea bottom is performed by sending sound waves from one or more acoustic sources down into the sea bottom where they are reflected at the transitions between different types of formations. The reflected signals are received by sensors positioned in the seismic cables. The towed cable array is towed along a chosen path to perform the survey in a chosen area. The movements of the vessel and the array must be controlled precisely to secure a coverage of the wanted areas.

Accurate control of the vessels and arrays positions are especially important when the same reflection points are to be surveyed more than once to improve the measurements. This may be done by controlling the time between the emitted acoustic signals relative to the distance between the sensors and the vessels velocity so that the next signal is reflected from the reflection point up to a later sensor along the same cable.

To secure accurate measurements it is usual to monitor the position of the vessel using existing navigation systems to correct this. It has, however, become evident that it is difficult to obtain the required accuracy, among other reasons because of the size and momentum of the vessels. Different systems have also been used for compensating for the errors, e.g. signal treatment, over sampling or by controlling the deflectors pulling the array sideways out from the vessel, thus increasing the complexity of the system, e.g. as the control signals and power has to be transmitted from the vessel out to the deflectors.

U.S. Pat. No. 4,781,140 describes a system for compensating for the orientation of a vessel relative to the direction of movement. The seismic cables are coupled to rigid beams the orientation of which are changed using wires when the vessel for example has to be directed against the wind or current. It does, however, not provide any possibility for compensating for deviations in the vessels position from the predetermined path.

It is an object of the present invention to provide a simple system using existing navigation systems for compensating for drift and movements relative to a predetermined course, without making large demands to the manoeuvring systems of the vessel and to the systems treating the seismic data. It is also an object of the present invention to provide a system using simple and commercially available equipment position on the vessel.

It is a further object of the invention to provide a system and a method making it possible to maintain the seismic cables in a linear movement even if the towing vessel must perform manoeuvres departing from the predetermined direction within certain limits.

These objects are obtained using a system and a method as disclosed in the accompanying independent claims.

The invention will be described in detail below with reference to the accompanying drawings, illustrating the invention by way of examples.

Figure 1:
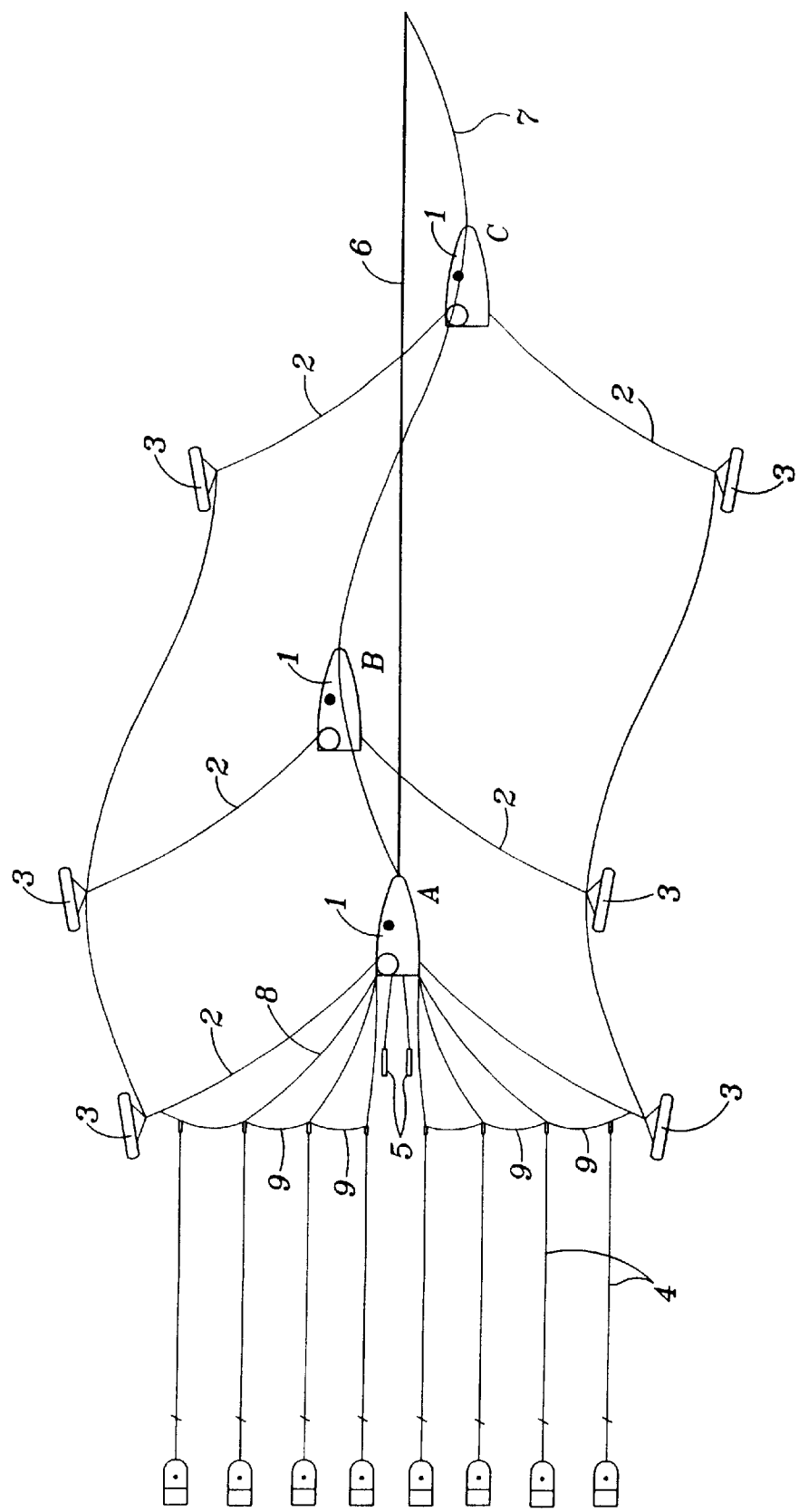
FIG. 1 illustrates movements of a seismic survey vessel according to the known art.

FIG. 1 illustrates how a seismic survey vessel 1 according to the known art may move under influence of different wind and current conditions. The vessel 1 is coupled to a seismic array 2, 3, 4, 8 comprising towing cables 2, 8 and deflectors 3 stretching a tow sideways relative the towing direction, and seismic cables 4 comprising sensors, such as hydrophones. In addition the tow comprises seismic sources 5, which in this case are coupled directly to the vessel 1.

In FIG. 1 the vessel is supposed to follow a predetermined course 6, but because of wind and current conditions the real movement 7 will deviate from this. The control system compensating for the deviations will usually result in an oscillating movement around the predetermined course, which is illustrated in the vessels positions A, B, and C in the drawing. The seismic array, being coupled to the vessel with towing cables, lead-ins or similar 2, 8 having a fixed length, will follow the movements of the vessel.

Figure 2:
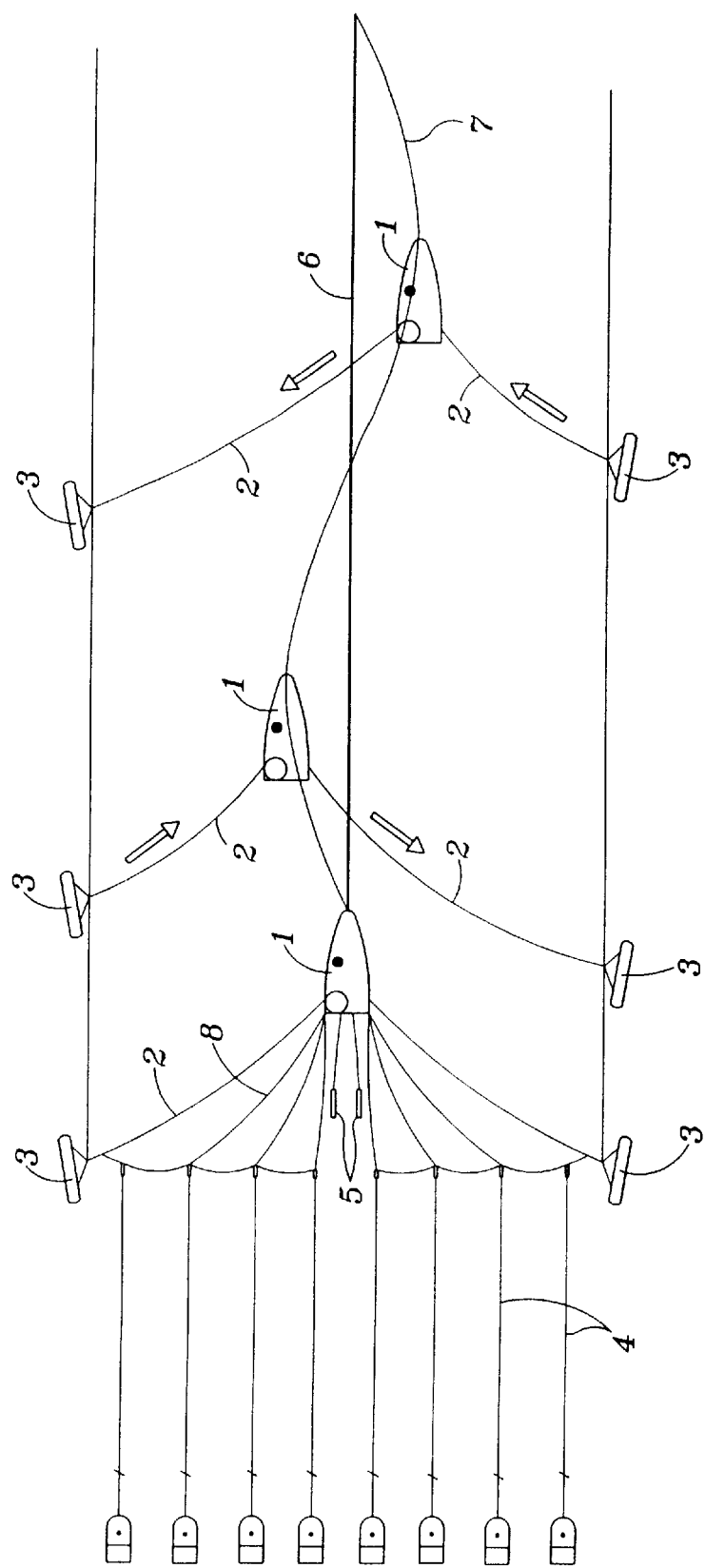
FIG. 2 illustrates the movements of a seismic survey vessel according to the invention.

In FIG. 2 the vessel is provided with devices changing the length of the towing cables as a response to changes in the position of the vessel relative to the predetermined course 6. These devices may be any kind of available equipment, e.g. winches, and will not be described in any detail here. One example of a possible winch is the Scan-control 2000 system from Scandinavian Control Systems AS, Norway, being mainly used in fishing trawlers. In some cases already existing winches for taking in or out the towing cables, lead-ins or similar may be used, when they are suitable for connecting to a control system.

The vessel is in a usual manner equipped with navigation systems, e.g. the GPS (Global Positioning System), which may provide a measure of the deviations from the predetermined course, and which may be used to compensate for the variations in the movements of the vessel. As it is significantly easier and faster to pull in or let out the towing wire the position of the array may be adjusted faster than the vessels position. Thus the towed seismic array, represented by the deflectors 3 in positions B and C, may keep a more stable course than the towing vessel itself.

In position B in FIG. 2 the vessel 1 is at the left of the predetermined course. To compensate for this the towing cable 2 is shortened, thus moving the deflector closer to the vessel. In a similar manner the right towing cable is let out, so that the right deflector increases its distance to the vessel 1.

In position C in FIG. 2 the vessel is to the right of the predetermined path, and the towing cables are compensated by making the right cable shorter and the left cable longer.

For exact control over the seismic arrays position the vessel may be provided with devices for measuring the positions of one or more of the array parts, e.g. the deflectors, relative to the vessel. Then the measured deviation in the vessels position may be compensated directly by letting out or pulling in a sufficient amount of cable until the deflector has the correct position, both globally and relative to the vessel.

Alternatively the cable length being let out or pulled in is adjusted as a function of the angle $\theta$ between a line from the vessel to the deflector and the predetermined direction of movement and the deviation from the vessels predetermined position.

In case of deviations being perpendicular to the predetermined course the cable length may be adjusted with $$\Delta k = \frac{a_\perp}{\sin\theta},$$

$\Delta k$ being the change in the cable length and $a_{195}$ being the measured deviation perpendicular to the direction of movement.

If the position of the vessel deviates in the direction of movement, e.g. due to changes in the velocity, this may be compensated in the same way according to $$\Delta k = \frac{a_\parallel}{\cos\theta},$$

$a_\parallel$ being the deviation parallel to the predetermined course.

Preferably this compensation is done simultaneously with all the cables, lead-ins etc being coupled to the system. This may of course also be done in combination with compensation for the transversal deviation $a\perp$.

In practice these simple models must be adjusted relative to the towing resistance of the towed seismic array.

As is evident from FIG. 2 the compensation for the transversal deviation will lead to a relative displacement of the deflectors in the direction of movement, thus changing the relative position of the seismic cables. If this makes a problem in the data acquisition the change may be compensated for in different ways, e.g. by adjusting the lengths of the seismic cables or by using active deflectors increasing their lift so that the variation in the used cable length is less while the deflector lift capability is used to keep a more even position relative to the towing vessel in the direction of movement. One example showing such an active deflector is for example disclosed in international patent application No. PCT/NO97/00302.

For increased precision the heave, roll and pitch movements of the vessel may be measured and compensated for according to the invention.

In the preferred embodiment of the invention the system comprises a deflector on each side of the vessel, in which the adjustment at least comprises the towing cables, but may also include the rest of the wires, cables, or lead-ins 8 in the shown embodiment and stretching to each of the seismic cables 4. This will also provide a possibility for adjusting the seismic cables position in the direction of movement for compensating for the displacement which otherwise will follow from the change in the length of the towing cable 2 to the deflector 3.

The drawings shows a towed array where the seismic cables 4 are connected to each other and to the deflectors with cables 9 thus providing the required distance between the cables. It is of course possible to split the tow into a number of parts, each being coupled to one or more deflectors, and where the position of each of these parts may be adjusted to keep the towed seismic array in a predetermined course.

Even if the drawings show a symmetrical tow it is of course possible to the invention with asymmetrical arrays, for example in cases where a number of vessels together creates a towed seismic array. One solution when the whole array is towed on one side of the vessel may also be contemplated, e.g. in surveys close to the shore, where the vessel must be kept at a certain distance from land.

Even if the invention is primarily described as a means for compensating for drift relative to the predetermined course it is clear that it also may be used for keeping the the seismic array along a predetermined path while the vessel for example manoeuvres to avoid obstructions. For example it may be used in rivers where the sailable path is not necessarily straight.

What is claimed is:

1. A system for controlling a marine seismic array comprising at least one deflector at one side of a towing vessel coupled through a towing cable, said at least one deflector being placed in a first position at a distance perpendicular to a direction of movement of the towing vessel, the towing vessel being equipped with a navigation system for measuring a second position of said towing vessel, characterized in that the towing vessel comprises calculation means for calculating deviations in movement of the towing vessel relative to a predetermined course;

that said towing cable is coupled to the towing vessel through a control means for varying towing cable length from the towing vessel to said at least one deflector;

that the control means are coupled to the calculation means for adjusting said towing cable length depending on said deviations in said second position, thus to counteract corresponding deviations in movement of said at least one deflector.

2. The system according to claim 1, characterized in that a deviation in said second position perpendicular to said direction of movement is compensated by the control means by adjusting said towing cable length with a length corresponding to the deviation divided by sine of an angle between a line from the control means to said at least one deflector and the predetermined course.

3. The system according to claim 1, characterized in that a deviation in said second position relative to said direction of movement is compensated by the control means by adjusting said towing cable length with a length corresponding to the deviation divided by cosine of an angle between a line from the control means to the said at least one deflector and the predetermined course.

4. The system according to claim 1, characterized in that the towing vessel comprises means for measuring said first position of said at least one deflector relative to the towing vessel, and that compensation for deviations in said first position comprises controlling a global position of said at least one deflector based on said second position and said first position.

5. The system according to claim 1, characterized in that said calculating means also comprises means for measuring deviations in roll, pitch, and heave of the towing vessel, and said control means also are adapted to compensate for said deviations in roll, pitch, and heave.

6. The system according to claim 1, characterized in that said marine seismic array comprises two deflectors, one on each side of the towing vessel relative to said direction of movement of the towing vessel, each of said two deflectors being coupled to said control means and where said marine seismic array is spanned between said two deflectors.

7. The system according to claim 1, characterized in that said control means comprises means for adjusting a lift capability of said at least one deflector for adjusting said first position.

8. A method for controlling a marine seismic array comprising at least one deflector at one side of a towing vessel coupled through a towing cable, said at least one deflector being placed in a first position with a distance perpendicular to a direction of movement of the towing vessel, the towing vessel being equipped with a navigation system for measuring a second position of the towing vessel, characterized in calculating deviations in movements of the towing vessel relative to a predetermined course, and varying length of said towing cable from the towing vessel to said at least one deflector depending on said deviations, thus to counteract corresponding deviations in movements of the at least one deflector.

9. The method according to claim 8, characterized in that compensation for a deviation in said second position perpendicular to said direction of movement is performed by varying towing cable length with a length corresponding to said deviation in said second position divided by sine of an angle between a line from said control means to said at least one deflector and said predetermined course.

10. The method according to claim 8, characterized in that compensation for a deviation in said second position relative to said direction of movement is performed by varying towing cable length with a length corresponding to said deviation in said second position divided by cosine of an angle between a line from said control means to said at least one deflector and said predetermined course.

11. The method according to claim 8, characterized in measuring said first position of said at least one deflector relative to the towing vessel, and controlling a global position of said at least one deflector based on said second position and said first position relative to the towing vessel.

12. The method according to claim 8, characterized in measuring deviations in roll, pitch, and heave of towing vessel, and compensating for said deviations in roll, pitch, and heave by varying towing cable length.

13. The method according to claim 8, characterized in adjusting a lift capability of said at least one deflector to adjust said first position.

14. A system for controlling movement of a seismic array in tow by a marine vessel, with said seismic array having deflectors coupled by way of towing cables to said marine vessel, and said marine vessel having a navigation system, which comprises:

calculating means in communication with said navigation system and receiving position of said marine vessel from said navigation system, and calculating the refrom deviations of said position from a predetermined path; and control means connected to said towing cables and in communication with said calculating means for adjusting length of said towing cables to compensate for said deviations and thereby maintain said deflectors on said predetermined path.

15. The system of claim 14, wherein said seismic array is symmetrical with at least one deflector on each side of said marine vessel, said at least one deflector being coupled to said marine vessel by means of towing cables, and said seismic array further including seismic sensors coupled to said towing cables by means of seismic cables, and said seismic cables being connected in parallel a distance apart by means of transverse cables located between said towing cables.

16. The system of claim 15, wherein said control means adjusts length of said seismic cables to compensate for said deviations.

17. The system of claim 15, wherein said control means adjusts length of both said towing cables and said seismic cables to compensate for said deviations.

18. The system of claim 14, wherein said navigation system is a Global Positioning System.

19. The system of claim 14, wherein said navigation system calculates positions of said deflectors globally and relative to said marine vessel, and calculates said position of said marine vessel, and wherein said control means compensates for said deviations by adjusting length of said towing cables to maintain said deflectors parallel to said predetermined path.

20. The system of claim 14, wherein for those of said deviations which are perpendicular to said predetermined path, said control means adjusts length of said towing cables in accordance with a formula $\Delta k = a_\perp / \sin \theta$, where $a_\perp$ is a perpendicular deviation which is perpendicular to said predetermined path, $\Delta k$ is a change in cable length, and $\theta$ is an angle between said predetermined path and a line from said control means to one of said deflectors.

21. The system of claim 20, wherein said control means adjusts length of all of said towing cables at a same time.

22. The system of claim 14, wherein for those of said deviations which are parallel to said predetermined path, said control means adjusts length of said towing cables in accordance with a formula $\Delta k = a_\parallel / \cos \theta$, where $a_\parallel$ is a parallel deviation which is parallel to said predetermined path, $\Delta k$ is a change in cable length, and $\theta$ is an angle between said predetermined path and a line from said control means to one of said deflectors.

23. The system of claim 22, wherein said control means adjusts length of all of said towing cables at a same time.

24. The system of claim 14, wherein said deviations include both deviations perpendicular to said predetermined path and deviations parallel to said predetermined path, and said control means adjusts length of all of said towing cables at a same time.

25. The system of claim 14, wherein said deflectors are active deflectors and said control means adjusts lift of said deflectors to compensate for said deviations.

26. The system of claim 14, wherein said deviations include heave, roll, and pitch as well as deviations perpendicular to said predetermined path and deviations parallel to said predetermined path.

27. The system of claim 14, wherein said seismic array is comprised of plural parts, each part being coupled to at least one of said deflectors, and said control means adjusting length of said towing cables to position said plural parts to maintain said seismic array on said predetermined path.

28. The system of claim 14, wherein said seismic array is asymmetrical.

29. The system of claim 14, wherein said control means is a winch.

30. A method for controlling movement of a seismic array having deflectors for maintaining span of said seismic array, and being in tow by a marine vessel having a navigation system, a calculating means in communication with said navigation system, and a control means responsive to said calculating means, which comprises following steps:

said navigation system determining position of said marine vessel;

said calculating means receiving position of said marine vessel from said navigation system;

said calculating means determining deviations in said position relative to a predetermined path; and said control means varying length of towing cables connecting said control means to said deflectors to compensate for said deviations, and thereby maintain said deflectors along a path parallel to said predetermined path.

31. The method of claim 30, wherein said navigation system is a Global Positioning System, and said control means is a winch.

32. The method of claim 30, wherein step of determining deviations in said position includes calculating deviations perpendicular to said predetermined path, and calculating deviations parallel to said predetermined path.

33. The method of claim 30, wherein said control means is varying length of seismic cables connected to said towing cables.

34. The method of claim 33, wherein said control means is varying length of said towing cables to compensate for said deviations, and varying length of said seismic cables to compensate for relative displacement in direction of movement of said marine vessel.

35. The method of claim 30, wherein said deflectors are active deflectors, and said control means is varying lift of said active deflectors to compensate for said deviations.

36. The method of claim 30, wherein said deviations are deviations in pitch, roll, and heave of said marine vessel.

\* \* \* \* \*